United States Patent
Benboubakeur et al.

(10) Patent No.: US 11,074,134 B2
(45) Date of Patent: Jul. 27, 2021

(54) SPACE MANAGEMENT FOR SNAPSHOTS OF EXECUTION IMAGES

(71) Applicant: INTERNATIONAL BUSINESS MACHINES CORPORATION, Armonk, NY (US)

(72) Inventors: Moncef Benboubakeur, Brno (CZ); Erik Rueger, Ockenheim (DE); Anuradha Bhamidipaty, Yorktown Heights, NY (US); Michael Starkey, Vancouver (CA); Jiri Nehybka, Velka Bites (CZ)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 16/110,562

(22) Filed: Aug. 23, 2018

(65) Prior Publication Data

US 2020/0065195 A1 Feb. 27, 2020

(51) Int. Cl.
*G06F 11/14* (2006.01)
*G06F 9/455* (2018.01)
*G06F 16/11* (2019.01)

(52) U.S. Cl.
CPC ...... *G06F 11/1458* (2013.01); *G06F 9/45558* (2013.01); *G06F 16/128* (2019.01); *G06F 2009/45583* (2013.01); *G06F 2201/84* (2013.01)

(58) Field of Classification Search
None
See application file for complete search history.

(56) References Cited

U.S. PATENT DOCUMENTS 6,594,744 B1 7/2003 Humlicek
7,925,622 B2 4/2011 Chapman
(Continued)

FOREIGN PATENT DOCUMENTS

WO 2010071662 A1 6/2010

OTHER PUBLICATIONS

Buonocore, Daniel; VMWARE: Creating Snapshots in a Different Location Than Default Virtual Machine Directory (1002929); https://blog.vmpros.nl/2009/05/14/vmware-creating-snapshots-in-a-different-location-than-default-virtual-machine-directory-1002929/; retrieved from the Internet Feb. 1, 2018; 4 pages.
(Continued)

*Primary Examiner* — Kris E Mackes
*Assistant Examiner* — Soheila (Gina) Davanlou
(74) *Attorney, Agent, or Firm* — Schmeiser, Olsen & Watts; Maeve M. Carpenter (57) ABSTRACT

An approach is provided for storing a snapshot of an execution image of a virtual machine (VM) instance. Based on VM, application, criticality, and change parameters, and based on a recommendation model trained on historical data about effects that changes caused by VM execution had on a capacity of a storage system that stores execution images of VM instances in first datastores, a tier is selected from multiple tiers of the storage system as the tier recommended for storing the snapshot. A datastore is selected for storing the snapshot so that the selected datastore is associated with the selected tier and selected from second datastores dedicated to storing only snapshots. The snapshot is created in the selected datastore and in the selected tier and unused space in a portion of the storage system for storing the first datastores is reduced.

20 Claims, 5 Drawing Sheets

(56) References Cited

U.S. PATENT DOCUMENTS

| | | | |
|---|---|---|---|
| 8,037,032 B2 | 10/2011 | Pershin | |
| 8,103,840 B2 | 1/2012 | Hwang | |
| 9,047,238 B2 | 6/2015 | Zaslavsky | |
| 9,086,903 B2 | 7/2015 | Khatri | |
| 9,116,846 B2 | 8/2015 | Vasilyev | |
| 9,223,610 B2 | 12/2015 | Kalmbach | |
| 9,256,464 B2* | 2/2016 | Jamjoom | G06F 9/45533 |
| 9,501,233 B2 | 11/2016 | Harris | |
| 2011/0197024 A1* | 8/2011 | Thomas | G06F 3/0631 |
| | | | 711/114 |
| 2014/0149696 A1 | 5/2014 | Frenkel | |
| 2014/0258657 A1* | 9/2014 | Schott | G06F 3/067 |
| | | | 711/162 |
| 2014/0279900 A1 | 9/2014 | Gupta | |
| 2015/0040127 A1* | 2/2015 | Dippenaar | G06F 9/5044 |
| | | | 718/1 |
| 2015/0058580 A1* | 2/2015 | Lagar Cavilla | G06F 3/0608 |
| | | | 711/149 |
| 2017/0097776 A1 | 4/2017 | Vasilyev | |
| 2018/0039434 A1* | 2/2018 | Balcha | G06F 3/0665 |
| 2019/0310881 A1* | 10/2019 | Gupta | G06F 9/45558 |

OTHER PUBLICATIONS

Changing the location of snapshot delta files for virtual machines in ESCi 5.x (2007563) WMware Knowledge Base; https://kb.vmware.com/s/article/2007563#q=2007563; retrieved from the Internet Aug. 23, 2018; 3 pages.

Creating Snapshots in a Different Location Than Default Virtual Machine Directory for VMWARE ESXI and VMWARE ESX (1002929); https://kb.vmware.com/s/article/1002929; retrieved from the Internet Feb. 1, 2018; 3 pages.

\* cited by examiner

SPACE MANAGEMENT FOR SNAPSHOTS OF EXECUTION IMAGES

BACKGROUND

The present invention relates to managing virtualized environments, and more particularly to reducing space usage for execution image snapshots.

In known virtualized systems in which a change is being made, the file of a virtual machine (VM) instance is locked and a snapshot is taken of an execution image of the VM instance before any change occurs which is caused by further execution of the VM instance, thereby keeping a fast restore point in case a decision is made to roll back the change. Conventional techniques to create a snapshot of a VM include a hypervisor (1) creating a new snapshot file in which all the changes for the VM will be stored; (2) writing all the new changes for the VM in the newly created file; (3) in response to a roll back request, removing the newly created file and unlocking the original file of the VM to accept write requests; and (4) in response to a merge request, updating the original file with all modifications stored on the newly created file and subsequently removing the newly created file.

SUMMARY

In one embodiment, the present invention provides a method of storing a snapshot of an execution image of a virtual machine (VM) instance. The method includes a computer receiving a request to create the snapshot of the execution image in response to a change being performed in a virtualized system that includes the VM instance. The method further includes based on a size of the VM instance, a type of an operating system of the VM instance, a type of an application being executed by the VM instance, a criticality of the VM instance, and a type of the change, and based on a recommendation model trained in part on historical data about effects that changes caused by execution of VM instances had on a capacity of a storage system that stores execution images of the VM instances in first datastores, the computer selecting a tier from multiple tiers of the storage system as the tier recommended for storing the snapshot. The method further includes the computer selecting a datastore for storing the snapshot so that the selected datastore is associated with the selected tier. The datastore is selected from second datastores dedicated to storing snapshots in the storage system. The first and second datastores are mutually exclusive. The method further includes the computer creating the snapshot in the selected datastore and in the selected tier and reducing unused space in a portion of the storage system dedicated to storing the first datastores based on (i) the execution images of the VM instances being stored in the first datastores to utilize a full capacity of the first datastores without requiring free space in the first datastores reserved for snapshots of the execution images and (ii) the snapshot being created in the second datastores dedicated to storing snapshots.

In another embodiment, the present invention provides a computer program product for storing a snapshot of an execution image of a virtual machine (VM) instance. The computer program product includes a computer readable storage medium. Computer readable program code is stored in the computer readable storage medium. The computer readable storage medium is not a transitory signal per se. The computer readable program code is executed by a central processing unit (CPU) of a computer system to cause the computer system to perform a method. The method includes the computer system receiving a request to create the snapshot of the execution image in response to a change being performed in a virtualized system that includes the VM instance. The method further includes based on a size of the VM instance, a type of an operating system of the VM instance, a type of an application being executed by the VM instance, a criticality of the VM instance, and a type of the change, and based on a recommendation model trained in part on historical data about effects that changes caused by execution of VM instances had on a capacity of a storage system that stores execution images of the VM instances in first datastores, the computer system selecting a tier from multiple tiers of the storage system as the tier recommended for storing the snapshot. The method further includes the computer system selecting a datastore for storing the snapshot so that the selected datastore is associated with the selected tier. The datastore is selected from second datastores dedicated to storing snapshots in the storage system. The first and second datastores are mutually exclusive. The method further includes the computer system creating the snapshot in the selected datastore and in the selected tier and reducing unused space in a portion of the storage system dedicated to storing the first datastores based on (i) the execution images of the VM instances being stored in the first datastores to utilize a full capacity of the first datastores without requiring free space in the first datastores reserved for snapshots of the execution images and (ii) the snapshot being created in the second datastores dedicated to storing snapshots.

In another embodiment, the present invention provides a computer system including a central processing unit (CPU); a memory coupled to the CPU; and a computer readable storage device coupled to the CPU. The storage device includes instructions that are executed by the CPU via the memory to implement a method of storing a snapshot of an execution image of a virtual machine (VM) instance. The method includes the computer system receiving a request to create the snapshot of the execution image in response to a change being performed in a virtualized system that includes the VM instance. The method further includes based on a size of the VM instance, a type of an operating system of the VM instance, a type of an application being executed by the VM instance, a criticality of the VM instance, and a type of the change, and based on a recommendation model trained in part on historical data about effects that changes caused by execution of VM instances had on a capacity of a storage system that stores execution images of the VM instances in first datastores, the computer system selecting a tier from multiple tiers of the storage system as the tier recommended for storing the snapshot. The method further includes the computer system selecting a datastore for storing the snapshot so that the selected datastore is associated with the selected tier. The datastore is selected from second datastores dedicated to storing snapshots in the storage system. The first and second datastores are mutually exclusive. The method further includes the computer system creating the snapshot in the selected datastore and in the selected tier and reducing unused space in a portion of the storage system dedicated to storing the first datastores based on (i) the execution images of the VM instances being stored in the first datastores to utilize a full capacity of the first datastores without requiring free space in the first datastores reserved for snapshots of the execution images and (ii) the snapshot being created in the second datastores dedicated to storing snapshots.

Embodiments of the present invention provide full usage of datastores used to store VMs, thereby reducing or eliminating wasted space in the storage system. Embodiments of the present invention provide elasticity in the datastores dedicated to snapshots by clearly indicating the amount of space used for the snapshots and allowing a customer to pay an extra cost only for this space that is being used. Embodiments of the present invention provide easy monitoring of the overall usage of snapshots and easier and faster maintenance of the snapshots because the snapshots are stored in dedicated datastores. Embodiments of the present invention allow the creation of the snapshot in a faster or slower disk to increase performance during a change caused by execution of a VM instance or to lower the extra cost paid by the customer.

DETAILED DESCRIPTION

Overview

In conventional capacity planning, capacity planners and virtualization administrators typically keep at least 15% free space in each datastore in the storage systems. In the case of a VM with a high change rate, at least 20% free space is allotted. This amount of free space allows significant disk space to be available if snapshots are created for several VMs and are not removed for a long period of time. If VMs execute using snapshot files for long periods of time, the snapshots can grow large enough in size to consume all the aforementioned free space on the datastore, thereby causing a crash of the system and making a direct negative impact on a customer's business. Known techniques to avoid the aforementioned crash of the system include monitoring the consumption in datastores, forecasting when a datastore will run out of space, and prior to the forecasted time when the datastore runs out of space, relocating the VM instance to another datastore that has sufficient free space. Under the conventional capacity planning and the known techniques described above, a significant amount of disk space is wasted. For example, if there are 100 datastores, each having a size of 1 terabyte (TB), and 15% of each datastore is kept as free disk space, then there is a minimum of 15 TB of waste. Furthermore, the known techniques provision a snapshot before starting a change in a virtualized system and during the change, the snapshot is automatically hosted on the same datastore in the same storage tier as the execution image of the VM instance. The conventional provisioning of the snapshot before starting the change provides a non-elastic, fixed cost of storage to a customer who pays for space to be kept free in a datastore for the possibility of snapshots being created, even if that space is not used.

One or more embodiments of the present invention provide an execution image and snapshot management system that (1) receives input parameters about a snapshot to be created for an execution image of a VM instance, (2) recommends a storage tier based on the input parameters and a recommendation model, (3) creates the snapshot in the recommended storage tier of a datastore dedicated to storing snapshots of execution images, (4) monitors the snapshot for changes caused by additional execution of the VM instance, (5) recommends moving the snapshot to a reduced storage tier if movement criteria are satisfied, and (6) removes the snapshot from the datastore in the storage tier and merges the contents of the snapshot with the execution image if removal criteria are satisfied. Each of the stages of the process cycle for snapshot management, including creating the snapshot, moving the snapshot between different storage tiers, and removing the snapshot, depends on predefined rules or rules derived from machine learning techniques.

One or more embodiments address the unique challenges described above by utilizing centralized and dedicated datastores for the snapshots (i.e., the set of datastores that store the snapshots are mutually exclusive from the set of other datastores that store the execution images). By using the dedicated datastores for the snapshots which are mutually exclusive from the other datastores that store the execution images, one or more embodiments gain full usage of the other datastores that store the execution images, thereby reducing or eliminating wasted unused storage space.

One or more embodiments provide elasticity in the cost of datastores used for snapshots by clearly indicating to a customer the amount of space used for the snapshots and allowing the customer to pay extra only for the aforementioned amount of space.

One or more embodiments establish individual, independent tiering of snapshots based on historical data and a recommendation model, which can provide VM performance enhancement or cost savings. The performance enhancement is provided by placing or moving a snapshot to a higher-level tier that indicates the snapshot is stored using a disk technology that is faster than other disk technologies that are associated with other tiers. The cost savings is provided by placing or moving the snapshot to a lower-level tier that indicates the snapshot is stored using a disk technology that is less expensive that other disk technologies that are associated with other tiers.

The aforementioned tiering makes individualized determinations of the storage tiers in which snapshots are placed or to which snapshots are moved. The placement or movement of a snapshot into a storage tier is independent of the storage tier of the execution image corresponding to the snapshot. The movement of a snapshot from one tier to another tier can be performed without an impact to the corresponding execution image of the VM instance. One or more embodiments employ predefined rules or rules determined via machine learning as the basis for managing a lifecycle of a snapshot, including creating the snapshot, moving the snapshot between different storage tiers, and removing the snapshot.

One or more embodiments employ datastores dedicated to snapshots to allow a more efficient search for a particular snapshot. The search is more efficient because the search is advantageously limited to the few datastores that are dedicated to snapshots and does not have to include a search of the multiple datastores that store the execution images of VM instances. For example, after an administrator receives confirmation from a customer to remove a particular snapshot, the system described herein quickly finds the snapshot to be removed by an efficient search of only the dedicated datastores.

System for Storing and Managing a Snapshot of an Execution Image

Figure 1:
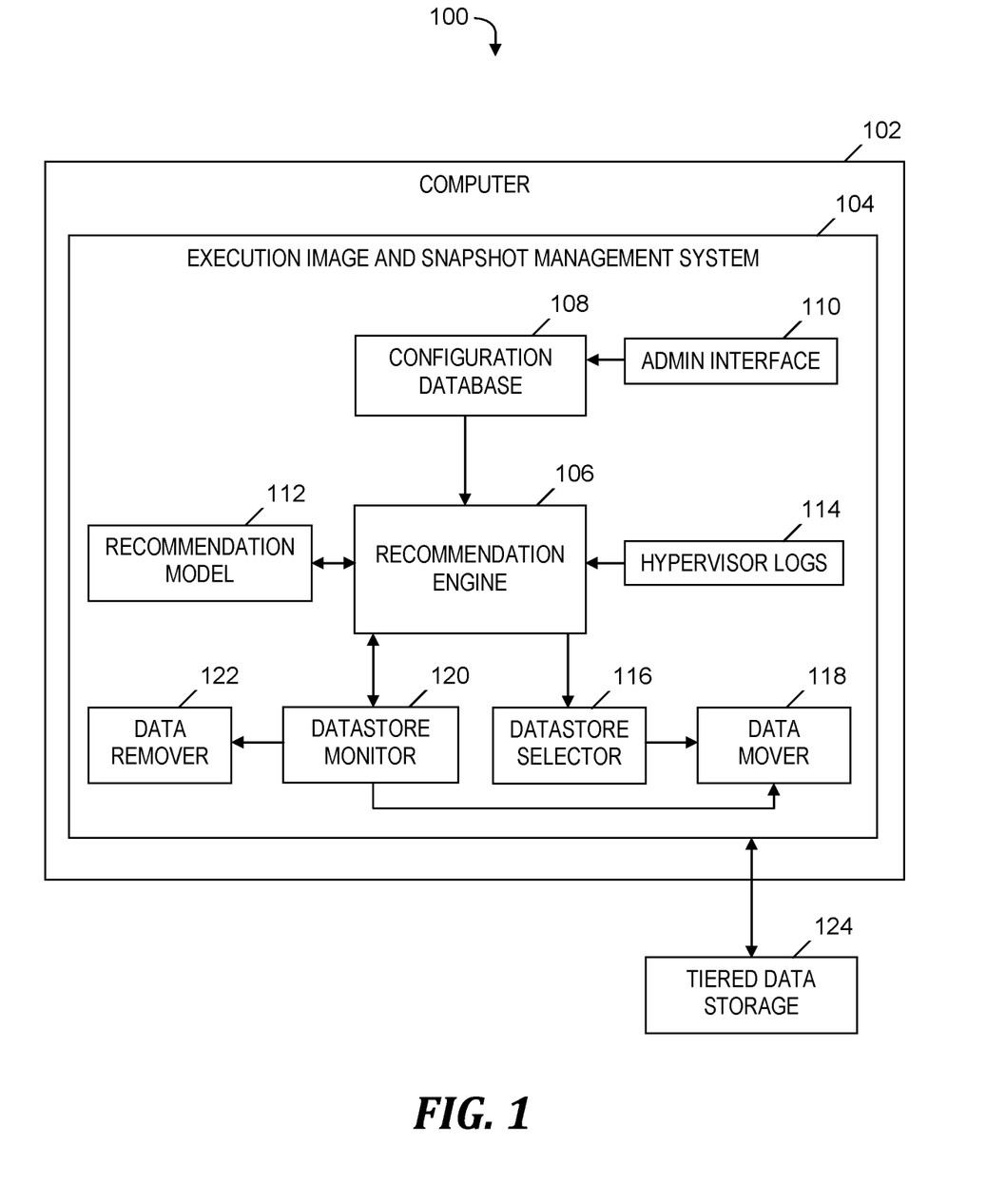
FIG. 1 is a block diagram of a system for storing and managing a lifecycle of a snapshot of an execution image of a virtual machine (VM) instance in a multi-tiered storage system, in accordance with embodiments of the present invention.

FIG. 1 is a block diagram of a system 100 for storing and managing a lifecycle of a snapshot of an execution image of a virtual machine instance in a multi-tiered storage system, in accordance with embodiments of the present invention. System 100 includes a computer 102, which executes a software-based execution image and snapshot management system 104 which includes a recommendation engine 106, a configuration database 108, an admin interface 110, a recommendation model 112, hypervisor logs 114, a datastore selector 116, a data mover 118, a datastore monitor 120, and a data remover 122.

Recommendation engine 106 is a machine learning engine that recommends a particular storage tier in which a snapshot of an execution image of a VM instance is to be created. In one embodiment, the VM instance is generated by a hypervisor (not shown). As used herein, a storage tier is also referred to simply as a "tier." Recommendation engine 106 selects the particular tier from among multiple tiers in a tiered data storage 124. Tiered data storage 124 provides two or more kinds of storage media that differ from each other in cost and/or performance (i.e., speed). In one embodiment, one or more tiers indicate storage on more expensive, faster performing disk storage and one or more other tiers indicate storage on less expensive, slower performing disk storage. For example, tiered data storage 124 includes Tiers 0, 1, 2, and 3, which are in order from most expensive to least expensive and also in order from fastest to slowest in performance.

Recommendation engine 106 selects the particular tier for a snapshot based on VM parameters, application parameters, business parameters, and change parameters. In one embodiment, the VM parameters include a size of the execution image of the VM instance and a type of the operating system (OS) associated with the VM instance. In one embodiment, the application parameters include a type of an application that executes on the VM instance (e.g., a payment application or a backend application). In one embodiment, the business parameters include an indication of a level of criticality of the VM instance as expressed by a customer. In one embodiment, the change parameters include a type of the change of a virtualized system, where the change is the basis for receiving or generating the request for creating the snapshot.

In one embodiment, recommendation engine 106 outputs a likely time at which the snapshot can be deleted based on the type of the change to the virtualized system being performed.

Recommendation model 112 is a model trained on historical data and domain knowledge provided by administrators. In one embodiment, the historical data includes indications of effects that changes caused by execution of VM instances had on a capacity of a storage system that stores execution images of the VM instances (i.e., changes that affect the size of the execution images of the VM instances). Execution image and snapshot management system 104 continuously refines recommendation model 112 using feedback from the administrators and the performance of system 100.

Datastore monitor 120 monitors the snapshots and triggers a movement or deletion of a snapshot based on the outcome of a change operation. For example, recommendation engine 106 recommends that a snapshot for a VM instance be created in tier-2 storage and indicates that the snapshot can be deleted after the change is closed and the typical duration for a change ticket closure for the change is one week. After one week, if the change ticket is closed, datastore monitor 120 invokes data remover 122 to remove the snapshot. If the change ticket is not closed after one week, datastore monitor 120 invokes data mover 118 to move the snapshot to a different tier.

Recommendation engine 106 selects the tier in which the snapshot is to be created and sends the selected tier to datastore selector 116, which selects a particular datastore on which the snapshot is to be created, where the datastore is selected from among multiple datastores. For example, recommendation engine 106 outputs Tier 1 as the selected tier for the snapshot, and Tier 1 is input to datastore selector 116, which outputs a datastore in the form of Datastore32-T1.

Data mover 118 is activated to move the snapshot from one datastore to another datastore according to different scenarios. For example, execution image and snapshot management system 104 creates the snapshot at the beginning of a change to a virtualized system on a high tier that indicates fast, expensive data storage. After the completion of the change, data mover 118 automatically transfers the snapshot to a low tier that indicates slow, less expensive data storage. As another example, execution image and snapshot management system 104 determines that a number of read/write input/output (I/O) operations performed during the change to the virtualized system is less than a threshold amount, and in response, data mover 118 moves the snapshot to a less expensive datastore to reduce the cost to a customer.

Datastore monitor 120 activates data remover 122 in response to a determination by recommendation engine 106 to delete a snapshot. Data remover 122 deletes the snapshot file and merges the contents of the snapshot with the original execution image of the VM instance.

Hypervisor logs 114 accesses logs populated by hypervisor(s) that create and run the VMs. Hypervisor logs 114 presents the information from the logs in a format that can be consumed by recommendation engine 106. Recommendation engine 106 receives the information from the logs from hypervisor logs 114, where the information includes data about previous changes and actions relative to executing the VMs during a change to a virtualized system that includes the VMs. Recommendation engine 106 uses machine learning techniques to learn from the previous changes and actions to determine how much certain types of changes use the capacity of data storage 124.

In one embodiment, execution image and snapshot management system 104 includes a ticketing tools connection (not shown), which allows execution image and snapshot management system 104 to learn information about previous changes to the virtualized system that includes the VMs (i.e., type of the change, assigned team, customer name, etc.). Execution image and snapshot management system 104 uses this information about previous changes for continuous training and learning to increase the accuracy of its selections of tiers and datastores.

Human administrators interact with execution image and snapshot management system 104 via admin interface 110 to configure the settings of execution image and snapshot management system 104. The settings include the ticketing tools connection, the type of logs that provide data to recommendation engine 106, a policy used by data remover 122 to delete a snapshot, etc. Execution image and snapshot management system 104 stores the settings in configuration database 108.

The functionality of the components shown in FIG. 1 is described in more detail in the discussion of FIG. 2, FIGS. 3A-3B, and FIG. 4 presented below.

Process for Storing and Managing a Snapshot of an Execution Image

Figure 2:
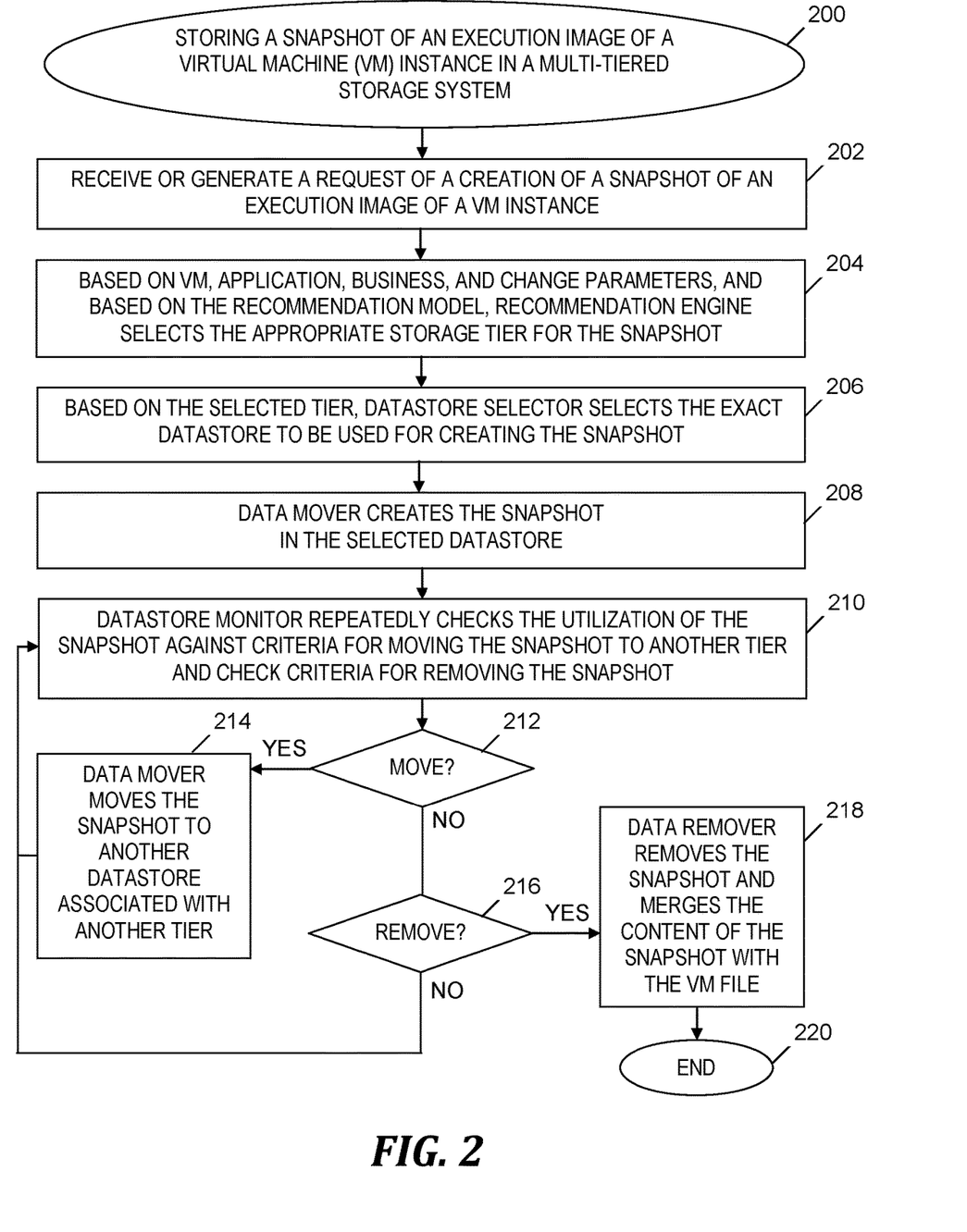
FIG. 2 is a flowchart of a process of storing and managing a lifecycle of a snapshot of an execution image of a virtual machine (VM) instance in a multi-tiered storage system, where the process is implemented in the system of FIG. 1, in accordance with embodiments of the present invention.

FIG. 2 is a flowchart of a process of storing and managing a lifecycle of a snapshot of an execution image of a virtual machine (VM) instance in a multi-tiered storage system, where the process is implemented in the system of FIG. 1, in accordance with embodiments of the present invention. The process of FIG. 2 begins at step 200. In step 202, execution image and snapshot management system 104 (see FIG. 1) receives a request for a creation of a snapshot of an execution image of a VM instance in response to execution image and snapshot management system 104 (see FIG. 1) detecting that a change is being performed in a virtualized system that includes the VM instance and other VM instances. In one embodiment, execution image and snapshot management system 104 (see FIG. 1) receives the request from an administrator via admin interface 110 (see FIG. 1). Alternatively, execution image and snapshot management system 104 (see FIG. 1) automatically generates the request for the creation of the snapshot in response to a scheduled start of a change in the virtualized system that includes the VM instance. In one embodiment, the VM instance is generated by a hypervisor.

In step 204, based on VM parameters, application parameters, business parameters, and change parameters, and based on recommendation model 112 (see FIG. 1), execution image and snapshot management system 104 (see FIG. 1) selects the appropriate storage tier for the snapshot from among multiple tiers in tiered data storage 124 (see FIG. 1). In one embodiment, step 204 also includes execution image and snapshot management system 104 (see FIG. 1) determining an expiration time of the snapshot based on the log file analysis of hypervisor logs 114 (see FIG. 1) and historical data and domain knowledge of recommendation model 112 (see FIG. 1). The historical data that is the basis for the expiration time includes data about the amounts of time that other snapshots were in existence prior to being removed, where the other snapshots are associated with a type of a change that matches the type of the change being performed in the virtualized system. In one embodiment, recommendation engine 106 (see FIG. 1) performs step 204.

In one embodiment, execution image and snapshot management system 104 (see FIG. 1) selects the tier in step 204 based on a default association between the tier for storing the snapshot and a tier for storing the execution image of the VM instance corresponding to the snapshot. Prior to step 204, execution image and snapshot management system 104 (see FIG. 1) receives configuration data from configuration database 108, where the configuration data specifies the aforementioned default association.

In one embodiment, execution image and snapshot management system 104 (see FIG. 1) selects the tier as the tier recommended for storing the snapshot, where the selected tier is different from the tier of the datastore in which the execution image of the VM instance is stored.

Prior to step 204, execution image and snapshot management system 104 (see FIG. 1) receives the VM, application, business, and change parameters from an administrator via admin interface 110 (see FIG. 1) and stores the aforementioned parameters in configuration database 108 (see FIG. 1). In one embodiment, step 204 includes execution image and snapshot management system 104 (see FIG. 1) retrieving the VM, application, business, and change parameters from configuration database 108 (see FIG. 1).

In one embodiment, the VM parameters include a size of the VM instance and a type of an operating system of the VM instance, the application parameters include a type of an application that executes on the VM instance (e.g., a payment application or a backend application), the business parameters include an indication of a level of criticality of the VM instance as expressed by a customer, and the change parameters include a type of the change being performed in the virtualized system.

In step 206, based on the tier selected in step 204, execution image and snapshot management system 104 (see FIG. 1) selects a particular datastore from among multiple datastores, where the selected datastore is to be used for creating the snapshot. In one embodiment, datastore selector 116 (see FIG. 1) performs step 206.

In step 208, execution image and snapshot management system 104 (see FIG. 1) creates the snapshot in the datastore selected in step 206. In one embodiment, data mover 118 (see FIG. 1) performs step 208.

In step 210, execution image and snapshot management system 104 (see FIG. 1) repeatedly checks a utilization of the snapshot against first criteria for moving the snapshot to another tier and checks second criteria for removing (i.e., deleting) the snapshot. In one or more embodiments, the first and second criteria are based on an exact date and time and/or input/output usage. In one embodiment, execution image and snapshot management system 104 (see FIG. 1) checks the utilization of the snapshot by repeatedly analyzing log files of active hypervisors for changes and actions with respect to active VM instances that affect the size of the execution images of the VM instances. In one embodiment, execution image and snapshot management system 104 (see FIG. 1) receives from the customer an approval of the change and a confirmation that the snapshot is permitted to be removed, which satisfies the second criteria for removing the snapshot. In one embodiment, datastore monitor 120 (see FIG. 1) performs step 210.

In step 212, execution image and snapshot management system 104 (see FIG. 1) determines whether the aforementioned first criteria for moving the snapshot to another tier are satisfied. If execution image and snapshot management system 104 (see FIG. 1) determines in step 212 that the first criteria are satisfied, then the Yes branch of step 212 is followed and step 214 is performed. In step 214, execution image and snapshot management system 104 (see FIG. 1) moves the snapshot to another datastore (i.e., a datastore which is different from the datastore selected in step 206) which is associated with another tier (i.e., a tier which is different from the tier selected in step 204). Following step 214, the process of FIG. 2 loops back to step 210.

In one embodiment, the first criteria include a check of whether the expected duration of the snapshot has passed and a check of whether a change ticket for the change is closed. The expected duration is based on recommendation model 112 (see FIG. 1) and historical data about amounts of time other snapshots were in existence prior to being removed, where the other snapshots are associated with a type of change that matches the type of the change being performed in the virtualized system. Alternatively, the first criteria consists of only determining whether the change ticket for the change is closed, and in response to determining that the change ticket is closed, execution image and snapshot management system 104 (see FIG. 1) automatically moves the snapshot from the selected tier to a different tier, where the storage associated with the different tier is less expensive than the storage associated with the selected tier.

If execution image and snapshot management system 104 (see FIG. 1) determines in step 212 that the first criteria for moving the snapshot to another tier are not satisfied, then the No branch of step 212 is followed and step 216 is performed.

In one embodiment, datastore monitor 120 (see FIG. 1) performs step 212. In one embodiment, data mover 118 (see FIG. 1) performs step 214.

In step 216, execution image and snapshot management system 104 (see FIG. 1) determines whether the second criteria for removing the snapshot are satisfied. If execution image and snapshot management system 104 (see FIG. 1) determines in step 216 that the second criteria for removing the snapshot are satisfied, then the Yes branch of step 216 is followed and step 218 is performed. In step 218, execution image and snapshot management system 104 (see FIG. 1) removes the snapshot from the datastore in which the snapshot was created in step 208, and also merges the content of the snapshot with a file that contains the execution image of the VM instance. In one embodiment, the second criteria include a check of whether the current time has reached the expiration time of the snapshot or has passed the expiration time of the snapshot and a check of whether a change ticket for the change in the virtualized system is closed. Following step 218, the process of FIG. 2 ends at step 220.

If execution image and snapshot management system 104 (see FIG. 1) determines in step 216, that the second criteria for removing the snapshot are not satisfied, then the No branch of step 216 is followed and the process of FIG. 2 loops back to step 210. In one embodiment, datastore monitor 120 (see FIG. 1) performs step 216. In one embodiment, data remover 122 (see FIG. 1) performs step 218.

As one example, in response to determining that the change is complete, execution image and snapshot management system 104 (see FIG. 1) first performs steps 210, 212, and 214 to move the snapshot to another tier associated with the least expensive datastore and in response to receiving a confirmation days later from the customer that the snapshot is permitted to be removed, performs steps 210, 216, and 218 to remove the snapshot.

Alternatively, execution image and snapshot management system 104 (see FIG. 1) performs the check for removing the snapshot prior to performing the check for moving the snapshot to a different tier.

In one embodiment, prior to step 202, execution image and snapshot management system 104 (see FIG. 1) determines a size of the VM instance and searches for and finds one or more datastores included in the datastores that store execution images, where the unused space size in each of the one or more datastores is at least the size of the VM instance. In one embodiment, if multiple datastores are found, then execution image and snapshot management system 104 (see FIG. 1) selects one of the multiple datastores, where the size of the unused space in the selected datastore is less than the size(s) of the unused space(s) in the other datastore(s) included in the multiple datastores. The size of the unused space in the selected data store is not required to exceed the size of the VM instance by a threshold amount. Execution image and snapshot management system 104 (see FIG. 1) stores the execution image of the VM instance in the datastore found as a result of the aforementioned search or the datastore selected from the multiple datastores, thereby providing an efficient usage of space in the datastores that store the execution images.

EXAMPLE

Figure 3A:
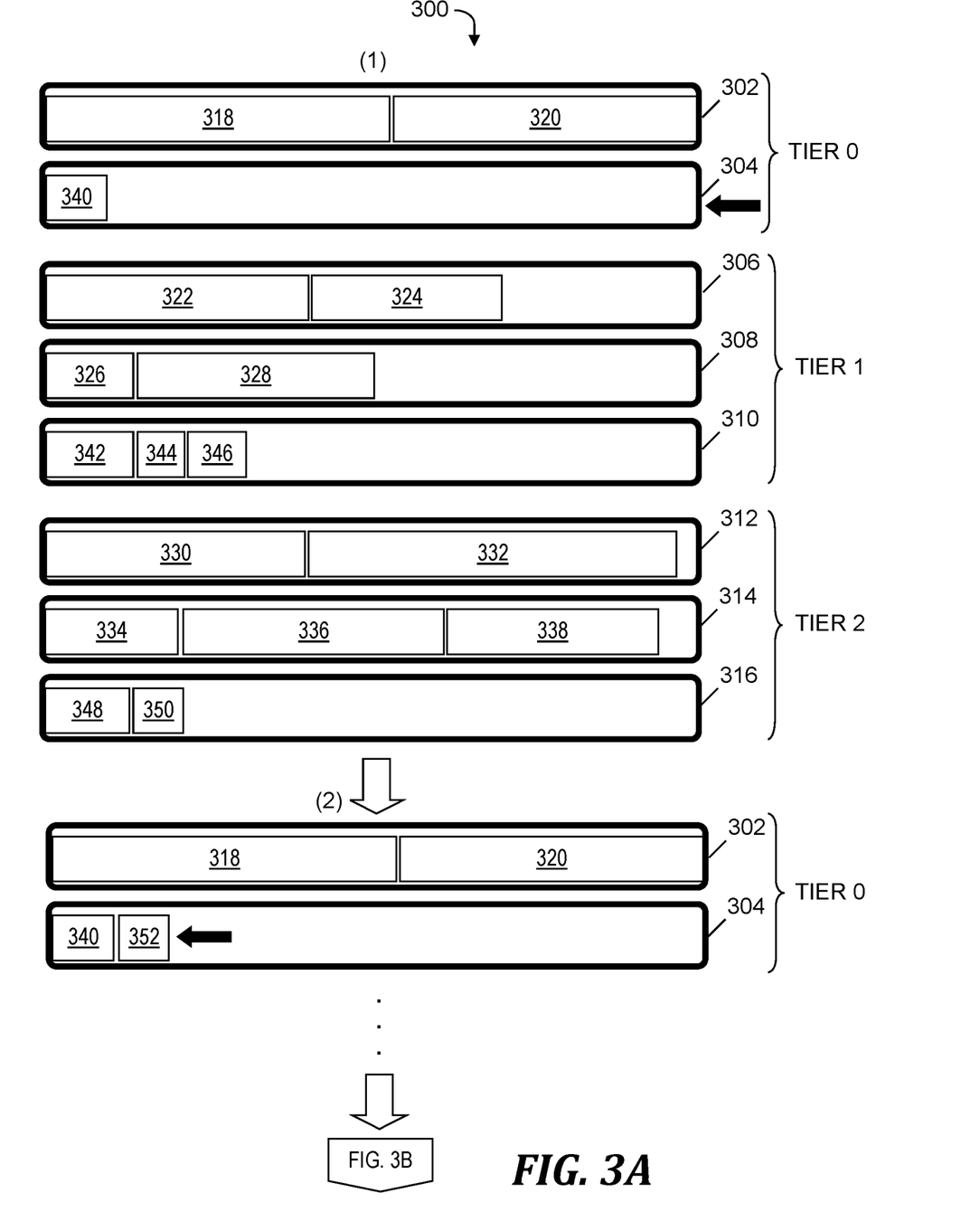
FIGS. 3A-3B depict an example of storing and managing a snapshot of an execution image of a virtual machine (VM) instance in a multi-tiered storage system using the process of FIG. 2, in accordance with embodiments of the present invention.
Figure 3B:
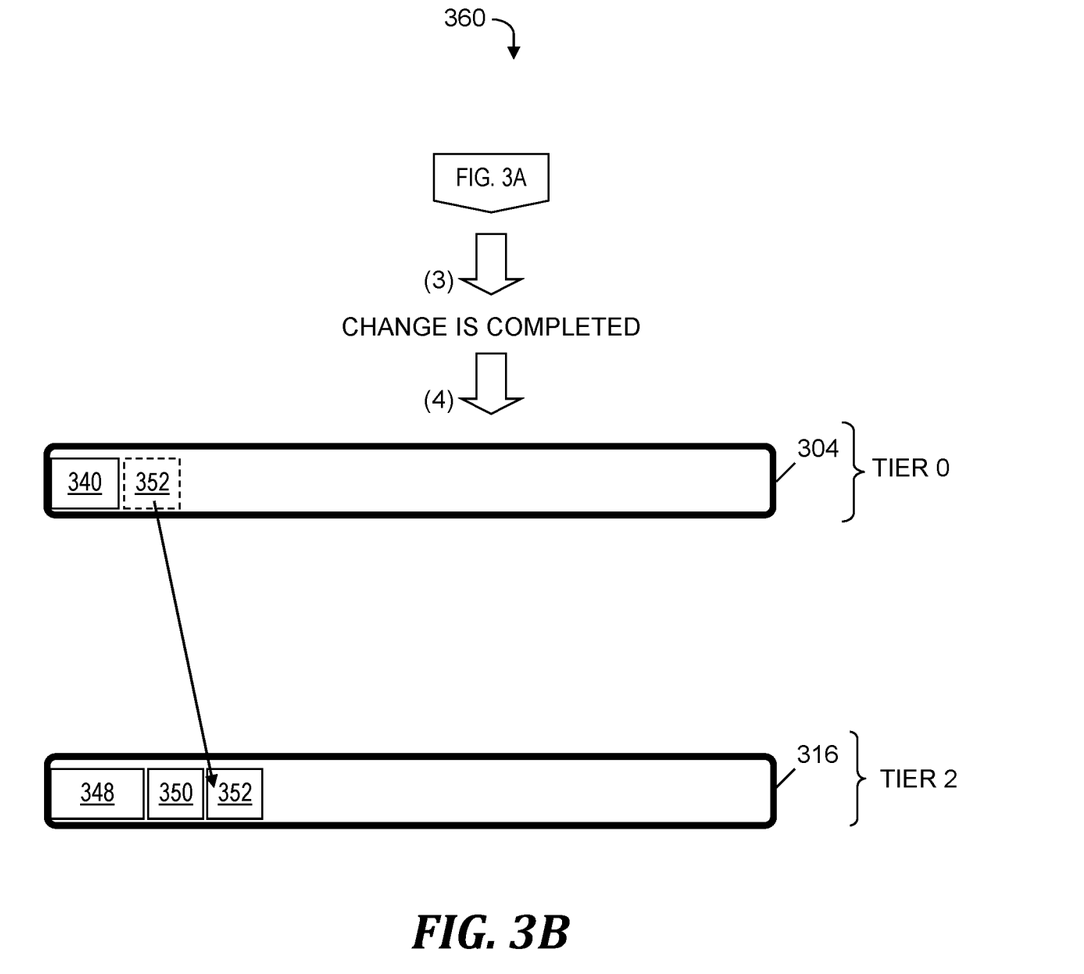

FIGS. 3A-3B depict an example of storing and managing a snapshot of an execution image of a virtual machine (VM) instance in a multi-tiered storage system using the process of FIG. 2, in accordance with embodiments of the present invention. A first portion 300 of the example of storing and managing the snapshot includes an initial configuration of datastores 302 and 304 in Tier 0, datastores 306, 308, and 310 in Tier 1, and datastores 312, 314, and 316 in Tier 2. In the example of FIGS. 3A-3B, Tier 0 indicates the most expensive storage on the fastest disk and Tier 2 indicates the least expensive storage on the slowest disk.

Datastores 302, 306, 308, 312, and 314 store only execution images of VM instances and do not store any snapshots. In the initial configuration of the example in FIGS. 3A-3B, datastore 302 stores execution images 318 and 320, datastore 306 stores execution images 322 and 324, datastore 308 stores execution images 326 and 328, datastore 312 stores execution images 330 and 332, and datastore 314 stores execution images 334, 336, and 338.

Datastores 304, 310 and 316 are dedicated datastores that store snapshots of execution images of VM instances and do not store any execution images. Dedicated datastore 304 initially stores snapshot 340 (which is a snapshot of execution image 318), dedicated datastore 310 stores snapshots 342, 344, and 346, and dedicated datastore 316 stores snapshots 348 and 350.

Prior to step (1) in the portion 300 of the example depicted in FIGS. 3A-3B, execution image and snapshot management system 104 (see FIG. 1) performs step 202 (see FIG. 2) to receive a request to create a snapshot of execution image 320. Prior to step (1) and after the request is received, recommendation engine 106 (see FIG. 1) performs step 204 (see FIG. 2) to select Tier 0 as the appropriate tier for the snapshot that is to be created.

In step (1), datastore selector 116 (see FIG. 1) performs step 206 (see FIG. 2) to select datastore 304 as the particular datastore to be used for creating the snapshot of execution image 320 of a VM instance in a virtualized system. The black-filled arrow to the right of datastore 304 indicates the selection in step 206 (see FIG. 2).

In step (2) in the portion 300 of the example depicted in FIGS. 3A-3B, data mover 118 (see FIG. 1) performs step 208 to create a snapshot 352 in datastore 304 in Tier 0 (i.e., the requested snapshot is created in the datastore selected in step 206 (see FIG. 2) and in the tier selected in step 204 (see FIG. 2)).

After step (2), the example depicted in FIGS. 3A-3B continues in a portion 360 of the example in FIG. 3B. In step (3) in FIG. 3B, datastore monitor 120 (see FIG. 1) performs step 210 (see FIG. 2) and step 218 (see FIG. 2) to determine that the change in the virtualized system is completed, thereby satisfying criteria for moving the snapshot 352 to another datastore in another tier.

In step (4), data mover 118 (see FIG. 1) performs step 220 (see FIG. 2) to automatically move snapshot 352 from datastore 304 in Tier 0 to datastore 316 in Tier 2 to reduce costs (i.e., moves snapshot 352 to a different datastore on a slower disk).

Computer System

Figure 4:
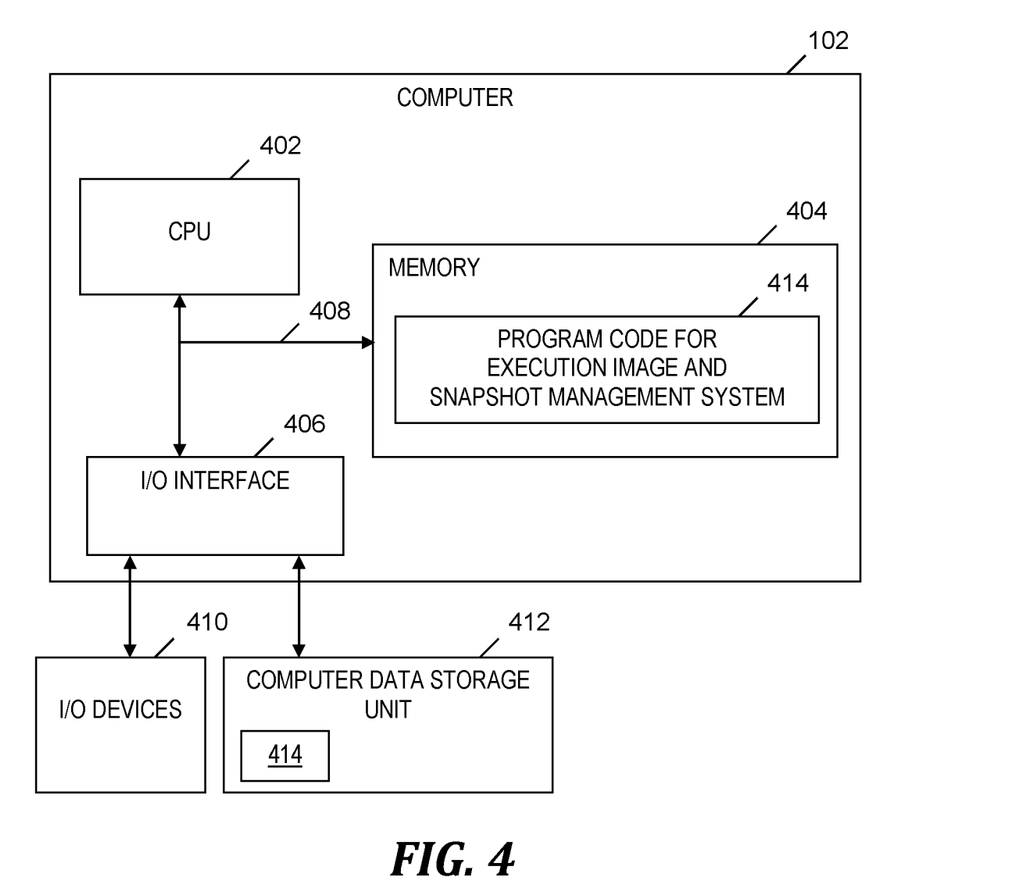
FIG. 4 is a block diagram of a computer included in the system of FIG. 1 and that implements the process of FIG. 2, in accordance with embodiments of the present invention.

FIG. 4 is a block diagram of a computer included in the system of FIG. 1 and that implements the process of FIG. 2, in accordance with embodiments of the present invention. Computer 102 is a computer system that generally includes a central processing unit (CPU) 402, a memory 404, an input/output (I/O) interface 406, and a bus 408. Further, computer 102 is coupled to I/O devices 410 and a computer data storage unit 412. CPU 402 performs computation and control functions of computer 102, including executing instructions included in program code 414 for execution image and snapshot management system 104 (see FIG. 1) to perform a method of storing and managing a lifecycle of a snapshot of an execution image of a VM instance in a multi-tiered storage system, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk). In one embodiment, computer data storage unit 412 includes tiered data storage 124 (see FIG. 1).

Memory 404 and/or storage unit 412 may store computer program code 414 that includes instructions that are executed by CPU 402 via memory 404 to store and manage a lifecycle of a snapshot of an execution image of a VM instance in a multi-tiered storage system. Although FIG. 4 depicts memory 404 as including program code, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to storing and managing a lifecycle of a snapshot of an execution image of a VM instance in a multi-tiered storage system. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to store and manage a lifecycle of a snapshot of an execution image of a VM instance in a multi-tiered storage system. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of storing and managing a lifecycle of a snapshot of an execution image of a VM instance in a multi-tiered storage system.

While it is understood that program code 414 for storing and managing a lifecycle of a snapshot of an execution image of a VM instance in a multi-tiered storage system may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider can offer to create, maintain, support, etc. a process of storing and managing a lifecycle of a snapshot of an execution image of a VM instance in a multi-tiered storage system. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 404 and computer data storage unit 412)

having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of storing a snapshot of an execution image of a virtual machine (VM) instance, the method comprising the steps of:
    a computer receiving a request to create the snapshot of the execution image in response to a change being performed in a virtualized system that includes the VM instance, the execution image of the VM instance being stored in first datastores;
    the computer applying a machine learning technique to first historical data about effects that changes caused by execution of other VM instances had on a capacity of a storage system that stores execution images of the other VM instances in the first datastores;
    based on the machine learning technique applied to the first historical data, the computer training a recommendation model;
    based on a size of the VM instance, a type of an operating system of the VM instance, a type of an application being executed by the VM instance, a criticality of the VM instance, and a type of the change, and based on the trained recommendation model, the computer selecting a storage tier from multiple storage tiers of the storage system as a storage tier recommended for storing the snapshot;
    the computer selecting a datastore for storing the snapshot so that the selected datastore is associated with the selected tier, the datastore being selected from second datastores, the second datastores being dedicated to storing snapshots in the storage system, and the first and second datastores being mutually exclusive;
    the computer creating the snapshot in the selected datastore and in the selected storage tier and reducing unused space in a portion of the storage system dedicated to storing the first datastores based on (i) the execution images of the VM instance and the other VM instances being stored in the first datastores to utilize a full capacity of the first datastores without requiring free space in the first datastores reserved for snapshots of the execution images and (ii) the snapshot being created in the second datastores dedicated to storing snapshots;
    the computer repeatedly analyzing log files of active hypervisors, the log files indicating changes associated with active VM instances that affect sizes of multiple execution images of the active VM instances;
    the computer determining an expiration time of the snapshot based on the analyzed log files of the active hypervisors, the trained recommendation model, and second historical data about amounts of time other snapshots were in existence prior to being removed in response to approval by customers, wherein the other snapshots are associated with a type of another change that matches the type of the change being performed in the virtualized system;
    the computer determining that the expiration time of the snapshot has been reached or has passed; and
    based on the analyzed log files of the active hypervisors, the trained recommendation model, the second historical data about the amounts of time the other snapshots were in existence prior to being removed in response to approval by customers, and the expiration time of the snapshot having been reached or passed, the computer removing the snapshot from the datastore.

2. The method of claim 1, further comprising the steps of:
    prior to the step of receiving the request, the computer determining the size of the VM instance and searching for and finding multiple datastores in the first datastores whose respective unused spaces have sizes, wherein each of the sizes of the unused spaces is at least the size of the VM instance;
    the computer selecting one datastore from the multiple datastores as the one datastore whose unused space has a size less than each of one or more sizes of unused space in one or more other datastores included in the multiple datastores, wherein the size of the unused space is not required to exceed the size of the VM instance by a threshold amount; and
    the computer storing the execution image of the VM instance in the one datastore, which provides an efficient usage of space in the first datastores.

3. The method of claim 2, further comprising the step of the computer receiving configuration data that specifies a default association between the storage tier for storing the snapshot and one storage tier included in the multiple storage tiers that is associated with the one datastore in which the execution image of the VM instance is stored, wherein the step of selecting the storage tier recommended for storing the snapshot includes selecting the storage tier based on the default association specified in the configuration data.

4. The method of claim 2, wherein the one datastore is associated with one storage tier included in the multiple storage tiers, and wherein the step of selecting the storage tier recommended for storing the snapshot includes the step of selecting the storage tier so that the storage tier recommended for storing the snapshot is different from the one storage tier associated with the one datastore in which the execution image of the VM instance is stored.

5. The method of claim 1, further comprising the steps of:
    based on the analyzed log files of the active hypervisors, the trained recommendation model, the second historical data about the amounts of time the other snapshots were in existence prior to being removed in response to approval by customers, and the expiration time of the snapshot having been reached or passed, the computer merging a content of the snapshot with a file that includes the execution image.

6. The method of claim 5, further comprising the step of the computer determining that a change ticket for the change is closed, wherein the steps of merging the content and removing the snapshot are performed based in part on the change ticket being closed.

7. The method of claim 1, further comprising the steps of:
    the computer determining an expected duration of the snapshot based on the recommendation model and historical data about amounts of time other snapshots were in existence prior to being removed, wherein the other snapshots are associated with a type of another change that matches the type of the change being performed in the virtualized system;
    the computer determining that the expected duration has passed and determining that a change ticket for the change is not closed;
    based on the expected duration having passed and the change ticket not being closed, the computer moving the snapshot from the selected storage tier to a different, second storage tier included in the multiple storage tiers, wherein the step of moving the snapshot from the selected storage tier to the second storage tier includes reducing a cost to a customer by moving the snapshot from a first disk in the selected storage tier whose first disk technology has a first cost to the customer to a second disk in the second storage tier whose second disk technology has a second cost to the customer, and wherein the second cost is less than the first cost;

subsequent to the step of moving the snapshot from the selected storage tier to the second storage tier, the computer receiving from a customer, an approval of the change and a confirmation that the snapshot is permitted to be removed; and in response to the step of receiving the approval of the change and the confirmation that the snapshot is permitted to be removed, and subsequent to the step of moving the snapshot from the selected storage tier to the second storage tier, the computer merging a content of the snapshot with a file that includes the execution image, and removing the snapshot from the datastore.

8. The method of claim 1, further comprising the steps of:
the computer determining that a change ticket for the change is closed; and
in response to the step of determining that the change ticket is closed, the computer automatically moving the snapshot from the storage tier to a different storage tier, wherein the different storage tier is less expensive than the storage tier.

9. The method of claim 1, further comprising the step of:
providing at least one support service for at least one of creating, integrating, hosting, maintaining, and deploying computer readable program code in the computer, the program code being executed by a processor of the computer to implement the steps of receiving the request, applying the machine learning technique, training the recommendation model, selecting the storage tier, selecting the datastore, creating the snapshot, reducing the unused space, repeatedly analysing the log files of the active hypervisors, determining the expiration time of the snapshot, determining that the expiration time of the snapshot has been reached or has passed, and removing the snapshot from the datastore.

10. A computer program product for storing a snapshot of an execution image of a virtual machine (VM) instance, the computer program product comprising a computer readable storage medium having computer readable program code stored on the computer readable storage medium, wherein the computer readable storage medium is not a transitory signal per se, the computer readable program code being executed by a central processing unit (CPU) of a computer system to cause the computer system to perform a method comprising the steps of:

the computer system receiving a request to create the snapshot of the execution image in response to a change being performed in a virtualized system that includes the VM instance, the execution image of the VM instance being stored in first datastores;

the computer system applying a machine learning technique to first historical data about effects that changes caused by execution of other VM instances had on a capacity of a storage system that stores execution images of the other VM instances in the first datastores;

based on the machine learning technique applied to the first historical data, the computer system training a recommendation model;

based on a size of the VM instance, a type of an operating system of the VM instance, a type of an application being executed by the VM instance, a criticality of the VM instance, and a type of the change, and based on the trained recommendation model, the computer system selecting a storage tier from multiple storage tiers of the storage system as a storage tier recommended for storing the snapshot;

the computer system selecting a datastore for storing the snapshot so that the selected datastore is associated with the selected tier, the datastore being selected from second datastores, the second datastores being dedicated to storing snapshots in the storage system, and the first and second datastores being mutually exclusive;

the computer system creating the snapshot in the selected datastore and in the selected storage tier and reducing unused space in a portion of the storage system dedicated to storing the first datastores based on (i) the execution images of the VM instance and the other VM instances being stored in the first datastores to utilize a full capacity of the first datastores without requiring free space in the first datastores reserved for snapshots of the execution images and (ii) the snapshot being created in the second datastores dedicated to storing snapshots;

the computer system repeatedly analyzing log files of active hypervisors, the log files indicating changes associated with active VM instances that affect sizes of multiple execution images of the active VM instances;

the computer system determining an expiration time of the snapshot based on the analyzed log files of the active hypervisors, the trained recommendation model, and second historical data about amounts of time other snapshots were in existence prior to being removed in response to approval by customers, wherein the other snapshots are associated with a type of another change that matches the type of the change being performed in the virtualized system;

the computer system determining that the expiration time of the snapshot has been reached or has passed; and based on the analyzed log files of the active hypervisors, the trained recommendation model, the second historical data about the amounts of time the other snapshots were in existence prior to being removed in response to approval by customers, and the expiration time of the snapshot having been reached or passed, the computer system removing the snapshot from the datastore.

11. The computer program product of claim 10, wherein the method further comprises the steps of:
prior to the step of receiving the request, the computer system determining the size of the VM instance and searching for and finding multiple datastores in the first datastores whose respective unused spaces have sizes, wherein each of the sizes of the unused spaces is at least the size of the VM instance;

the computer system selecting one datastore from the multiple datastores as the one datastore whose unused space has a size less than each of one or more sizes of the unused space in one or more other datastores included in the multiple datastores, wherein the size of the unused space is not required to exceed the size of the VM instance by a threshold amount; and the computer system storing the execution image of the VM instance in the one datastore, which provides an efficient usage of space in the first datastores.

12. The computer system program product of claim 11, wherein the method further comprises the step of the computer system receiving configuration data that specifies a default association between the storage tier for storing the snapshot and one storage tier included in the multiple storage tiers that is associated with the one datastore in which the execution image of the VM instance is stored, wherein the step of selecting the storage tier recommended for storing the snapshot includes selecting the storage tier based on the default association specified in the configuration data.

13. The computer system program product of claim 11, wherein the one datastore is associated with one storage tier included in the multiple storage tiers, and wherein the step of selecting the storage tier recommended for storing the snapshot includes the step of selecting the storage tier so that the storage tier recommended for storing the snapshot is different from the one storage tier associated with the one datastore in which the execution image of the VM instance is stored.

14. The computer system program product of claim 10, wherein the method further comprises the steps of:
based on the analyzed log files of the active hypervisors, the trained recommendation model, the second historical data about the amounts of time the other snapshots were in existence prior to being removed in response to approval by customers, and the expiration time of the snapshot having been reached or passed, the computer system merging a content of the snapshot with a file that includes the execution image.

15. The computer system program product of claim 14, wherein the method further comprises the step of the computer system determining that a change ticket for the change is closed, wherein the steps of merging the content and removing the snapshot are performed based in part on the change ticket being closed.

16. A computer system comprising:
a central processing unit (CPU);
a memory coupled to the CPU; and
a computer readable storage device coupled to the CPU, the computer readable storage device containing instructions that are executed by the CPU via the memory to implement a method of storing a snapshot of an execution image of a virtual machine (VM) instance, the method comprising the steps of:
the computer system receiving a request to create the snapshot of the execution image in response to a change being performed in a virtualized system that includes the VM instance, the execution image of the VM instance being stored in first datastores;
the computer system applying a machine learning technique to first historical data about effects that changes caused by execution of other VM instances had on a capacity of a storage system that stores execution images of the other VM instances in the first datastores;
based on the machine learning technique applied to the first historical data, the computer system training a recommendation model;
based on a size of the VM instance, a type of an operating system of the VM instance, a type of an application being executed by the VM instance, a criticality of the VM instance, and a type of the change, and based on the trained recommendation model, the computer system selecting a storage tier from multiple storage tiers of the storage system as a storage tier recommended for storing the snapshot;
the computer system selecting a datastore for storing the snapshot so that the selected datastore is associated with the selected tier, the datastore being selected from second datastores, the second datastores being dedicated to storing snapshots in the storage system, and the first and second datastores being mutually exclusive;
the computer system creating the snapshot in the selected datastore and in the selected storage tier and reducing unused space in a portion of the storage system dedicated to storing the first datastores based on (i) the execution images of the VM instance and the other VM instances being stored in the first datastores to utilize a full capacity of the first datastores without requiring free space in the first datastores reserved for snapshots of the execution images and (ii) the snapshot being created in the second datastores dedicated to storing snapshots;
the computer system repeatedly analyzing log files of active hypervisors, the log files indicating changes associated with active VM instances that affect sizes of multiple execution images of the active VM instances;
the computer system determining an expiration time of the snapshot based on the analyzed log files of the active hypervisors, the trained recommendation model, and second historical data about amounts of time other snapshots were in existence prior to being removed in response to approval by customers, wherein the other snapshots are associated with a type of another change that matches the type of the change being performed in the virtualized system;
the computer system determining that the expiration time of the snapshot has been reached or has passed; and
based on the analyzed log files of the active hypervisors, the trained recommendation model, the second historical data about the amounts of time the other snapshots were in existence prior to being removed in response to approval by customers, and the expiration time of the snapshot having been reached or passed, the computer system removing the snapshot from the datastore.

17. The computer system of claim 16, wherein the method further comprises the steps of:
prior to the step of receiving the request, the computer system determining the size of the VM instance and searching for and finding multiple datastores in the first datastores whose respective unused spaces have sizes, wherein each of the sizes of the unused spaces is at least the size of the VM instance;
the computer system selecting one datastore from the multiple datastores as the one datastore whose unused space has a size less than each of one or more sizes of unused space in one or more other datastores included in the multiple datastores, wherein the size of the unused space is not required to exceed the size of the VM instance by a threshold amount; and
the computer system storing the execution image of the VM instance in the one datastore, which provides an efficient usage of space in the first datastores.

18. The computer system of claim 17, wherein the method further comprises the step of the computer system receiving configuration data that specifies a default association between the storage tier for storing the snapshot and one storage tier included in the multiple storage tiers that is associated with the one datastore in which the execution image of the VM instance is stored, wherein the step of selecting the storage tier recommended for storing the snapshot includes selecting the storage tier based on the default association specified in the configuration data.

19. The computer system of claim 17, wherein the one datastore is associated with one storage tier included in the multiple storage tiers, and wherein the step of selecting the storage tier recommended for storing the snapshot includes the step of selecting the storage tier so that the storage tier recommended for storing the snapshot is different from the one storage tier associated with the one datastore in which the execution image of the VM instance is stored.

20. The computer system of claim 16, wherein the method further comprises the steps of:
 based on the analyzed log files of the active hypervisors, the trained recommendation model, the second historical data about the amounts of time the other snapshots were in existence prior to being removed in response to approval by customers, and the expiration time of the snapshot having been reached or passed, the computer system merging a content of the snapshot with a file that includes the execution image.

* * * * *